(12) United States Patent
Flood et al.

(10) Patent No.: US 10,066,098 B2
(45) Date of Patent: Sep. 4, 2018

(54) STYRENIC BLOCK COPOLYMER COMPOSITIONS

(71) Applicant: KRATON POLYMERS U.S. LLC, Houston, TX (US)

(72) Inventors: John E. Flood, Houston, TX (US); Kathryn J. Wright, Houston, TX (US); Xavier D. Muyldermans, Mont St. Guibert (BE); Mike Heniff, Houston, TX (US); Carl L. Willis, Houston, TX (US); Yonghua Zhou, Houston, TX (US); Aaron Brothers, Houston, TX (US)

(73) Assignee: Kraton Polymers U.S. LLC, Houston, TX (US)

( * ) Notice: Subject to any disclaimer, the term of this patent is extended or adjusted under 35 U.S.C. 154(b) by 64 days.

(21) Appl. No.: 15/268,166

(22) Filed: Sep. 16, 2016

(65) Prior Publication Data

US 2017/0073513 A1  Mar. 16, 2017

Related U.S. Application Data

(60) Provisional application No. 62/219,397, filed on Sep. 16, 2015, provisional application No. 62/360,375, filed on Jul. 9, 2016.

(51) Int. Cl.

| | | |
|---|---|---|
| *C08L 53/02* | (2006.01) | |
| *C09J 153/02* | (2006.01) | |
| *C08F 287/00* | (2006.01) | |
| *C08L 91/00* | (2006.01) | |

(52) U.S. Cl.
CPC ......... *C08L 53/025* (2013.01); *C09J 153/025* (2013.01); *C08F 287/00* (2013.01); *C08L 91/00* (2013.01); *C08L 2205/025* (2013.01); *C08L 2205/035* (2013.01); *C08L 2205/06* (2013.01); *C08L 2207/322* (2013.01)

(58) Field of Classification Search
CPC ............................... C08L 53/02; C08L 53/025
See application file for complete search history.

(56) References Cited

U.S. PATENT DOCUMENTS

| | | |
|---|---|---|
| 3,494,942 A | 2/1970 | Takuichi et al. |
| RE27,145 E | 6/1971 | Jones |
| 3,634,549 A | 1/1972 | Shaw et al. |
| 3,670,054 A | 6/1972 | De La Mare et al. |
| 3,700,633 A | 10/1972 | Wald et al. |
| 3,792,005 A | 2/1974 | Harlan |
| 4,107,131 A | 8/1978 | Gergen et al. |
| 4,578,429 A | 11/1986 | Gergen et al. |
| 4,882,384 A | 11/1989 | Willis et al. |
| 5,206,300 A | 4/1993 | Chamberlain |
| 5,276,101 A | 1/1994 | Chamberlain et al. |
| 5,506,299 A | 4/1996 | Gelles et al. |
| 5,516,831 A | 5/1996 | Pottick et al. |
| 6,653,408 B1 | 11/2003 | St. Clair |
| 7,001,956 B2 | 2/2006 | Handlin, Jr. et al. |
| 7,166,672 B2 | 1/2007 | Handlin, Jr. et al. |
| 7,220,798 B2 | 5/2007 | Atwood et al. |
| 7,625,979 B2 | 12/2009 | Atwood et al. |
| 2005/0154144 A1* | 7/2005 | Atwood ............... C08F 8/04 525/314 |
| 2008/0171828 A1 | 7/2008 | Bening et al. |
| 2009/0163361 A1 | 6/2009 | Handlin, Jr. et al. |
| 2011/0184082 A1 | 7/2011 | Wright et al. |
| 2013/0299731 A1* | 11/2013 | Wright ............... C08K 3/22 252/62 |
| 2014/0080963 A1 | 3/2014 | Wright |

\* cited by examiner

*Primary Examiner* — Jeffrey C Mullis

(74) *Attorney, Agent, or Firm* — Samantha Page; Cantor Colburn LLP

(57) ABSTRACT

This disclosure relates to a block copolymer composition comprising a tetra-branched block copolymer (IV) having a true number average molecular weight of 40,000 to 120,000 represented by the general formula (A-B)4X; a tri-branched block copolymer (III) having a true number average molecular weight of from 30,000 to 90,000 represented by the general formula (A-B)3X; di-branched block copolymer (II) having a true number average molecular weight of from 20,000 to 60,000 represented by the general formula (A-B) 2X; and a linear diblock copolymer (I) having a true number average molecular weight of from 10,000 to 30,000 represented by the general formula A-B; where A represents a polymer block of a mono alkenyl arene; B represents a polymer block of a conjugated diene, wherein the B has a true number average molecular weight ranging from 7,000 to 20,000 g/mol; and X represents the residue of an alkoxy silane coupling agent.

17 Claims, 3 Drawing Sheets

STYRENIC BLOCK COPOLYMER COMPOSITIONS

TECHNICAL FIELD

The present disclosure relates to the field of chemistry, in particular polymer chemistry. The present disclosure relates to the coupling of anionic polymers and to the hydrogenation of such coupled polymers which result in a polymer composition containing uncoupled polymer, linear and radial polymers.

BACKGROUND

Styrenic block copolymers are described in, for example, U.S. Pat. Nos. 7,625,979; 7,001,956, 7,166,672; and 7,220,798.

U.S. Pat. No. 7,625,979 discloses lithium-terminated polymers of one or more conjugated dienes and of one or more mono alkenyl arenes are coupled by reaction with an alkoxy silane coupling agent having the formula Rx-Si—(OR')y, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals, such that the resulting polymer composition contains less than about ten weight percent of uncoupled polymer diblock. The polymer compositions are subsequently selectively hydrogenated.

U.S. Pat. No. 7,001,956 discloses articles prepared from novel anionic block copolymers of mono alkenyl arenes and conjugated dienes, and to blends of such block copolymers with other polymers. The block copolymers are selectively hydrogenated and have mono alkenyl arene end blocks and conjugated diene mid blocks. The block copolymer may be blended with at least one other polymer selected from the group consisting of olefin polymers, styrene polymers, amorphous resins and engineering thermoplastic resins.

U.S. Pat. No. 7,166,672 discloses gels prepared from novel anionic block copolymers of mono alkenyl arenas and conjugated dienes, and to blends of such block copolymers with such polymers. The block copolymers are selectively hydrogenated and have A polymer blocks and B polymer blocks wherein A represents a polymer block of a mono alkenyl arene and B represents a polymer block of a conjugated diene. The block copolymer may be combined with tackifying resins, oils and other components to form a gel.

U.S. Pat. No. 7,220,798 discloses lithium-terminated polymers of one or more conjugated dimes and of one or more mono alkenyl arenes that are coupled by reaction with an alkoxy silane coupling agent having the formula $R_x$—Si—$(OR')_y$, where x is 0 or 1, x+y=4, R and R' are the same or different, R is selected from aryl hydrocarbon radicals, linear alkyl hydrocarbon radicals and branched alkyl hydrocarbon radicals, and R' is selected from linear and branched alkyl hydrocarbon radicals, such that the resulting polymer composition contains less than about ten weight percent of uncoupled polymer diblock. The polymer compositions are subsequently selectively hydrogenated.

However, there is still a need to produce styrenic block copolymers having the appropriate balance of low viscosity, high tensile strength, and/or isotropic mechanical properties.

SUMMARY OF THE INVENTION

The present disclosure provides a block copolymer composition comprising:

a. a tetra-branched block copolymer (IV) having a number average molecular weight of 40,000 to 120,000 represented by the general formula (A-B)4X;
b. a tri-branched block copolymer (III) having a number average molecular weight of from 30,000 to 90,000 represented by the general formula (A-B)3X;
c. a di-branched block copolymer (II) having a number average molecular weight of from 20,000 to 60,000 represented by the general formula (A-B)2X; and
d. a linear diblock copolymer (I) having a weight average molecular weight of from 10,000 to 30,000 represented by the general formula A-B; where:
   i. A represents a polymer block of a mono alkenyl arene, wherein the A block has a number average molecular weight ranging from 4,000 to 7,500 g/mol;
   ii. B represents a polymer block of a conjugated diene, wherein the B block has a number average molecular weight ranging from 7,000 to 20,000 g/mol; and
   iii. X represents the residue of an alkoxy silane coupling agent.

In some embodiments, the alkoxy silane coupling agent has the formula Rx-Si—(OR')y, where x is 0 or 1, x+y=4, R and R' are the same or different, R is selected from the group consisting of aryl hydrocarbon radicals, linear alkyl hydrocarbon radicals and branched alkyl hydrocarbon radicals, and R' is selected from the group consisting of linear and branched alkyl hydrocarbon radicals. In some embodiments, the block copolymer composition comprises:

a. 0 to 90 wt. %, based upon the total weight of the block copolymer composition, of the tetra-branched block copolymer (IV);
b. 0 to 90 wt. %, based upon the total weight of the block copolymer composition, of the tri-branched block copolymer (III);
c. 0 to 90 wt. %, based upon the total weight of the block copolymer composition, of the di-branched block copolymer (II); and
d. 0 to 90 wt. %, based upon the total weight of the block copolymer composition, of the linear diblock copolymer (I).

DETAILED DESCRIPTION

Figure 1:
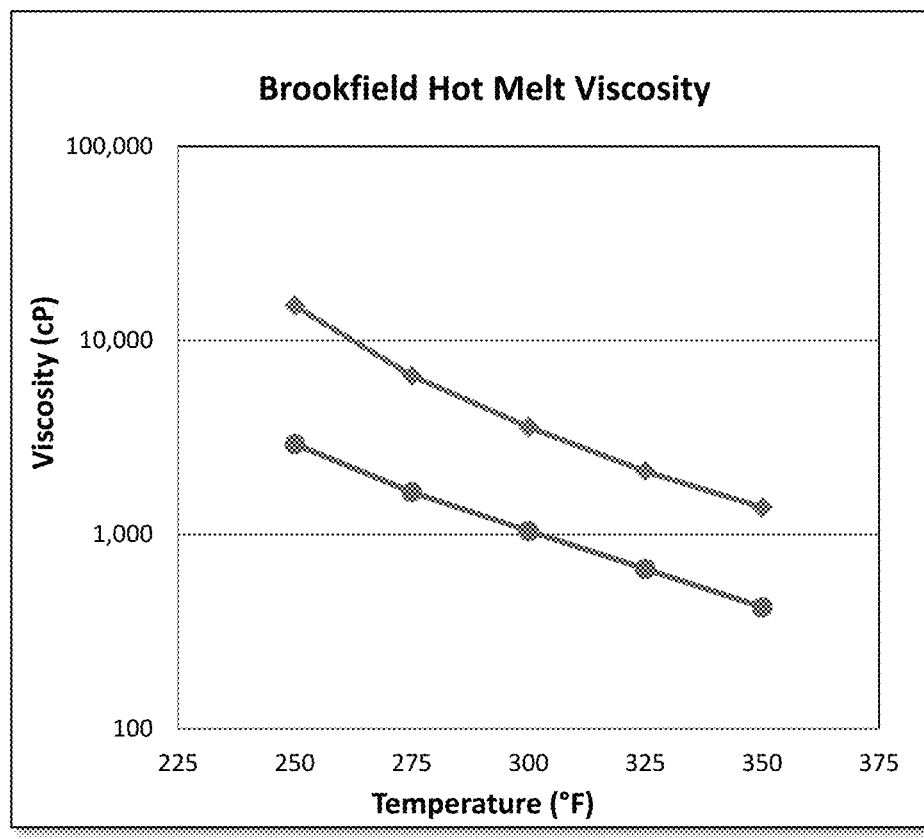
FIG. 1 shows a plot of the viscosity versus temperature for Example 5 (filled circles) and Comparative Example E (filled diamonds).

The present disclosure provides a block copolymer composition comprising:

a. a tetra-branched block copolymer (IV) having a number average molecular weight of 40,000 to 120,000 represented by the general formula (A-B)4X;
b. a tri-branched block copolymer (III) having a number average molecular weight of from 30,000 to 90,000 represented by the general formula (A-B)3X;
c. a di-branched block copolymer (II) having a number average molecular weight of from 20,000 to 60,000 represented by the general formula (A-B)2X; and d. a linear diblock copolymer (I) having a number average molecular weight of from 10,000 to 30,000 represented by the general formula A-B; where:
  i. A represents a polymer block of a mono alkenyl arene, wherein the A block has a number average molecular weight ranging from 4,000 to 7,500 g/mol;
  ii. B represents a polymer block of a conjugated diene, wherein the B block has a number average molecular weight ranging from 7,000 to 20,000 g/mol; and
  iii. X represents the residue of an alkoxy silane coupling agent.

In some embodiments, the alkoxy silane coupling agent has the formula Rx-Si—(OR')y, where x is 0 or 1, x+y=4, R and R' are the same or different, R is selected from the group consisting of aryl hydrocarbon radicals, linear alkyl hydrocarbon radicals and branched alkyl hydrocarbon radicals, and R' is selected from the group consisting of linear and branched alkyl hydrocarbon radicals.

In some embodiments, the block copolymer composition comprises:
  a. 0 to 90 wt. %, based upon the total weight of the block copolymer composition, of the tetra-branched block copolymer (IV);
  b. 0 to 90 wt. %, based upon the total weight of the block copolymer composition, of the tri-branched block copolymer (III);
  c. 0 to 90 wt. %, based upon the total weight of the block copolymer composition, of the di-branched block copolymer (II); and
  d. 0 to 90 wt. %, based upon the total weight of the block copolymer composition, of the linear diblock copolymer (I).

In some embodiments, the block copolymer composition has a solution viscosity ranging from 100 to 400 centipoise (cP), as measured in 20 wt. % of toluene at 25° C. In some embodiments, the block copolymer composition has a solution viscosity ranging from 140 to 375 centipoise (cP). Solution viscosity may be determined using a methodology described as follows: Dissolve a known weight amount of polymer in toluene to achieve a 20% polymer concentration. Polymer may not be dissolved if appears lumpy or tightly held bubbles visible. Once polymer is fully dissolved and incorporated in the toluene approximately 8.5-10 grams of the 20% polymer: 80% toluene solution are decanted into a disposable aluminum Brookfield viscosity tube with no entrained air bubbles. The sample and viscosity tube are placed in a Brookfield "Thermosel" at room temperature 25° C.+/−0.4° C. A Brookfield SC4-21 (shear rate (sec-1)=0.93N) viscosity spindle was used with a Brookfield DV2T rotational viscometer. The samples are then measured at multiple spindle RPM allowing for a number of different shear rates to be tested. Samples are conditioned until the viscosity reading stabilizes between each change in RPM. In some embodiments, the block copolymer composition has a melt flow rate ranging from 20 to 200 g/10 min., as measured at 230° C. with a load of 5 kg. In some embodiments, the block copolymer composition has a melt flow rate ranging from 25 to 110 g/10 min., as measured at 230° C. with a load of 5 kg.

In some embodiments, the block copolymer composition has a tensile strength ranging from 2000 to 8000 psi, as measured on melt cast films. In some embodiments, the block copolymer composition has a tensile strength ranging from 4000 to 6000 psi, as measured on melt cast films according to ASTM D412.

Throughout the present description and claims, all the standard tensile strength values are measured according to ASTM D638 or according to ASTM D412.

ASTM D638 is entitled "Standard Test Method for Tensile Properties of Plastics." The term "ASTM D638" as used herein refers to the standard test method for determining mechanical strength measurements for articles made from polymer materials described herein. Test specimens are often in the shape of bars but other shapes can also be sued as appropriate for the material being tested. The testing procedure is typically performed by an automated apparatus specifically designed for performing tensile tests. Two gripping devices within the apparatus are clamped to the specimen at a specified distance from each other. The apparatus moves the gripping devices away from each other so that they pull the specimen apart and stretch it until it breaks. Tensile modulus is typically given in Pascals, pounds per square inch, or other appropriate units. This test method was published on Dec. 15, 2014, the contents of which are incorporated herein by reference in its entirety.

ASTM D412 is entitled "Standard Test Method for Vulcanized Rubber and Thermoplastic Elastomers-Tension." The term "ASTM D412" as used herein refers to the standard test method for determining the tensile (tension) properties of vulcanized thermoset rubbers and thermoplastic elastomers. A dumbbell and straight section specimens or cut ring specimens can be used. For all testing performed herein according to ASTM D412, a Mini D die was used to cut the specimens and a 50 mm/min. tensile rate was used. This test method was published on Dec. 1, 2015, the contents of which are incorporated herein by reference in its entirety. For the referenced ASTM standards, visit the ASTM website, www.astm.org, or contact ASTM Customer Service at service@astm.org.

In some embodiments, the block copolymer composition has an anisotropy ratio based upon the MD/CD 300% modulus and/or based upon the tensile strength of less than 1.4. In some embodiments, the block copolymer composition has an anisotropy ratio based upon the MD/CD 300% modulus and/or based upon the tensile strength ranging from 1 to less than 1.4.

In specific embodiments, the range of styrene block size is between 4 and 7.5 kg/mol, and the butadiene block size is equal to or greater than 7 kg/mol and less than 20 kg/mol, and the block copolymer composition has good mechanical properties and low melt and solution viscosity. In some cases when styrene block sizes are less than 6.0 kg/mol or the percent polystyrene is less than 30% (preferably closer to 25%), biaxial films with desirable properties can be achieved.

In one embodiment, the present disclosure is a process which includes a step of reacting a living lithium-terminated polymer having the formula P—Li where P is a copolymer chain of one or more conjugated dienes having 4 to 12 carbon atoms and one or more mono alkenyl arenes having 8 to 18 carbon atoms with the alkoxy silane coupling agent. The preferred acyclic conjugated dienes that can be polymerized into the polymer chain P of the present disclosure are those containing 4 to 8 carbon atoms. Examples for such conjugated dienes are 1,3-butadiene (termed "butadiene" in the claims and elsewhere in the specification), 2,3-dimethyl-1,3butadiene, piperylene, 3-butyl-1,3octadiene, isoprene, 2-phenyl-1,3-butadiene.

Mono alkenyl arenes that can be polymerized together with the dienes to form the polymer chain P are preferably those selected from the group consisting of styrene, the methyl styrenes, particularly 3-methylstyrene, the propyl styrenes, particularly 4-propyl styrene, the butyl styrenes, particularly p-t-butylstyrene, vinylnapthalene, particularly 1-vinylnapthalene, cyclohexyl styrenes, particularly 4-cyclohexyl styrene, p-tolyl styrene, and 1-vinyl-5-hexylnaphthalene.

The polymer chains P can be homopolymers of the conjugated diene monomers defined or can be copolymers of diene monomers and mono alkenyl-substituted aromatic monomers. The copolymers, in turn, can be random or tapered copolymers, as well as block copolymers of these various monomers. The presently preferred monomers are isoprene, 1,3-butadiene and styrene. The presently preferred polymer chains P are those where the conjugated dienes are present in a major amount and the mono vinyl-substituted arenes are present in a minor amount. It is preferred that the mono alkenyl arene content be from about 5 to about 50 weight percent of the total block copolymer, more preferably from about 10 to about 35 weight percent.

The preferred polymer of the present disclosure is one that is obtained by coupling a living lithium-terminated polymer selected from the group consisting of homopolymers of conjugated dienes having from 4 to 12 carbon atoms and copolymers of at least one diene of from 4 to 12 carbon atoms.

In accordance with another embodiment of this disclosure, there is provided a process for making the polymers defined above which comprises a coupling reaction between a living polymer having the formula P—Li and a coupling agent as defined above, wherein Li is lithium and P is as described above.

The quantity of coupling agent employed with respect to the quantity of living polymers P—Li present depends largely upon the degree of coupling and the properties of the coupled polymers desired. Preferably the coupling agent defined above will be employed in a range of from about 0.35 to about 0.7 moles of coupling agent per mole of lithium, P—Li, more preferably from about 0.4 to about 0.55 moles of coupling agent based upon the moles of lithium present in the polymer, P—Li, most preferably about 0.45 moles of coupling agent per mole of lithium, P—Li. At lower silicon coupling agent to lithium chain end molar ratios Si/Li (mol/mol), there is not enough coupling agent present to allow high levels of coupling; the coupling efficiency will start to decline if lower Si/Li molar ratios are employed. Lower levels of coupling will tend to lead to a block copolymer product having less strength; the unlinked arms tend to dilute out the strength forming network in the block copolymer A further problem with using lower Si/Li molar ratios is that at high conversion it will tend to advance the coupling reaction to make higher levels of 4-arm coupled product. The 4-arm coupled product may contribute to excessive viscosity in the melt which makes melt processing of the product more difficult. Lower Si/Li (mol/mol) ratios are also not preferred because they can lead to weaker products that are more difficult to melt process.

On the other hand, Si/Li (mol/mol) ratios in excess of about 0.7 are also not preferred. At Si/Li (mol/mol)=0.5, there is sufficient coupling agent present to couple all of the chain ends into a linear, 2-arm product; this is the preferred result. Higher levels of Si/Li (mol/mol) only result in the addition of excess coupling agent. The addition of excess reagent contributes added cost to the process without an advantage in the quality of the coupled polymer. At ratios greater than about 0.7, the excess coupling agent will tend to cap living chain ends without linking them together; this will contribute to a decline in coupling efficiency at higher Si/Li molar ratios. Lower coupling efficiency will afford block copolymer products having less strength. The use of Si/Li (mol/mol) ratios in excess of about 0.7 will unnecessarily increase the cost of the process and will afford lower quality coupled polymers.

As stated above, the coupling agent used in the present disclosure is an alkoxy silane of the general formula Rx-Si—(OR')y, where x is 0 or 1, x+y=4, R and R' are the same or different, R is selected from aryl, linear alkyl and branched alkyl hydrocarbon radicals, and R' is selected from linear and branched alkyl hydrocarbon radicals. The aryl radicals preferably have from 6 to 12 carbon atoms. The alkyl radicals preferably have 1 to 12 carbon atoms, more preferably from 1 to 4 carbon atoms. Preferred tetra alkoxy silanes are tetramethoxy silane ("TMSi"), tetraethoxy silane ("TESi"), tetrabutoxy silane ("TB Si"), and tetrakis(2-ethylhexyloxy)silane ("TEHSi"). Preferred trialkoxy silanes are methyl trimethoxy silane ("MTMS"), methyl triethoxy silane ("MTES"), isobutyl trimethoxy silane ("IBTMO") and phenyl trimethoxy silane ("PhTMO"). Of these the more preferred are tetraethoxy silane and methyl trimethoxy silane.

The temperature at which the coupling reaction is carried out can vary over a broad range and, for convenience, often is the same as the temperature of polymerization. Although the temperature can vary broadly from about 0° to 150° C., it will preferably be within the range from about 30° C. to 100° C., more preferably about 55° C. to about 80° C.

The coupling reaction is normally carried out by simply mixing the coupling agent, neat or in solution, with the living polymer solution. The reaction period is usually quite short, and can be affected by the mixing rate in the reactor. The normal duration of the coupling reaction will be in the range of 1 minute to 1 hour. Longer coupling periods may be required at lower temperatures.

After the coupling reaction, the linked polymers may be recovered, or if desired they may be subjected to a selective hydrogenation of the diene portions of the polymer. Hydrogenation generally improves thermal stability, ultraviolet light stability, oxidative stability, and weatherability of the final polymer. It is important that the coupling agents not interfere with or otherwise "poison" the hydrogenation catalyst.

Hydrogenation can be carried out via any of the several hydrogenation or selective hydrogenation processes. For example, such hydrogenation has been accomplished using methods such as those disclosed in, for example, U.S. Pat. Nos. 3,494,942; 3,634,549; 3,670,054; 3,700,633; and U.S. Pat. No. Re. 27,145. These methods operate to hydrogenate polymers containing aromatic or ethylenic unsaturation, and are based upon operation of a suitable catalyst. Such catalyst, or catalyst precursor, preferably comprises a Group VIII metal such as nickel or cobalt which is combined with a suitable reducing agent such as an aluminum alkyl or hydride of a metal selected from Groups I-A, II-A and III-B of the Periodic Table of the Elements, particularly lithium, magnesium or aluminum. This hydrogenation can be accomplished in a suitable solvent or diluent at a temperature from about 20° C. to about 60° C., and a pressure of about 2 bars to about 10 bars. Other catalysts that are useful include titanium based catalyst systems and various heterogeneous catalysts.

Hydrogenation can be carried out under such conditions that at least about 90 percent of the conjugated diene double bonds have been reduced, and between zero and 10 percent of the arene double bonds have been reduced. Preferred ranges are at least about 95 percent of the conjugated diene double bonds have been reduced, and more preferably about 98 percent of the conjugated diene double bonds are reduced. Alternatively, it is possible to hydrogenate the polymer such that aromatic unsaturation is also reduced beyond the 10 percent level mentioned above. In that case, the double bonds of both the conjugated diene and arene may be reduced by 90 percent or more.

It has been found, that when employing tetramethoxy silane as the coupling agent without passivation by the addition of alcohol, the polymer tends to degrade on hydrogenation. The degradation appears to be by cleaving arms off at the Si coupling center. This could be reduced or eliminated by contacting the coupled polymer with an alcohol, such as methanol, after coupling is complete and prior to hydrogenation. In that case it is preferred that the ratio of alcohol to P—Li be from about 1 to 1.5 moles of alcohol per mole of P—Li (where the amount of P—Li in the calculation is based on the amount of living chain ends which were present prior to the addition of the coupling agent). However, it has been found that much less alcohol is needed when employing tetraethoxy silane or tetrabutoxy silane as the coupling agent. In that situation the ratio of alcohol to P—Li should be from about 0.05 to about 0.5 moles of alcohol per mole of P—Li. Likewise, when using trialkoxy silanes such as MTMS or IBTMO, it is preferable to add an alcohol, such as 2-ethyl hexanol prior to hydrogenation. For example, the alcohol can be added prior to hydrogenation at a ratio of alcohol to P—Li of about 0.05 to about 0.5 moles of alcohol per mole of P—Li.

After hydrogenation, the hydrogenated polymers may be cleaned up by standard techniques, such as addition of aqueous acid solutions to remove the residues of the polymerization initiator and hydrogenation catalyst. It is usually preferred to add an antioxidant to the reaction mixture before isolation of polymer.

The polymer is separated from the reaction mixture by standard techniques, such as steam stripping or coagulation with a suitable non-solvent such as an alcohol or water. In the case of steam stripping, the polymer crumb may be separated from the volatile solvent by countercurrent flow through a cyclone. In a like manner, the coagulated polymer crumb may be separated from the liquid solvent phase by centrifugation or filtration. Alternatively, the polymer may be recovered by passing the cement through a devolatilizing extruder. Residual solvent and other volatiles can be removed from the isolated polymer by heating, optionally under reduced pressure or in a forced airflow.

In accordance with a further embodiment of this disclosure, there is provided a process for producing the polymers as defined above. This process includes basically three steps. The first step is the step in which a living polymer having the formula P—Li is produced. The second step is that in which this living polymer is coupled with the coupling agent of this disclosure as defined above. The third step, which is optional, is a hydrogenation step.

The first step of this process is carried out by reacting a mono-functional lithium initiator system with the respective monomer or monomers to form the living polymer chain P—Li. This polymerization step can be carried out in one step or in a sequence of steps. In the case where the polymer chain P is a homopolymer or a random or tapered copolymer of two or more monomers, the monomers are simultaneously polymerized with the lithium initiator. In the case where the polymer chain P is a block copolymer comprising two or more homo- or copolymer blocks, these individual blocks can be generated by incremental or sequential monomer addition.

The monomers that are generally employed, as well as the monomers that are preferably used have been defined above in connection with the novel polymers of this disclosure. These monomers are also preferred for the process of the present disclosure.

The lithium-based initiator systems used in the first step of the process to make the coupled polymers of this disclosure are based on lithium having the general formula R" Li wherein R" is a hydrocarbyl radical of 1 to about 20 carbon atoms. Examples of such lithium initiators are methyllithium, isopropyllithium, n-butyllithium, sec-butyllithium, t-octyllithium, n-dodecyllithium, n-eicosyllithium, phenyllithium, naphthyllithium, p-tolyllithium, 4-phenylbutyllithium, cyclohexyllithium, and 4-cyclohexyllithium. The amount of the lithium initiator employed depends upon the desired properties of the polymer, particularly the desired molecular weight. Normally, the organomonolithium initiator is employed in the range of from about 0.1 to about 100 gram millimoles per 100 grams of total monomers.

The polymerization reaction is carried out in the presence of a hydrocarbon diluent. Preferably the hydrocarbon diluent is a paraffinic, cycloparaffinic or aromatic hydrocarbon having from 4 to 10 carbon atoms or a mixture of such diluents. Examples for the diluent are n-hexane, hexanes, n-heptane, heptanes, 2,2,4-trimethylpentane, cyclohexane, cyclopentane, isopentane, benzene and toluene. The reaction is generally carried out with a weight ratio of diluent to monomers exceeding 1. Preferably the diluent is employed in a quantity of from about 200 to about 1000 parts by weight per 100 parts by weight of total monomers.

It is also important to control the molecular weight of the various blocks. Regarding the AB block copolymer composition, for each A block the desired block number average molecular weights may range from about 4,000 (g/mol) to about 7,500 (g/mol). In some examples, the A block may have a number average molecular weight, ranging from 4,000 to about 7,000. In some examples, the A block may have a number average molecular weight ranging from about 4,000 to about 6,500 (g/mol).

For each B block, the number average molecular weight ranges from 7,000 to 20,000. In some embodiments, the B block has a number average molecular weight ranging from 7,000 to less than 20,000. In some embodiments, the B block has a number average molecular weight ranging from 12,000 to 19,500 (g/mol). In specific embodiments, the B block has a number average molecular weight between 13,000 to 19,000.

The following describes the method used to characterize the polymer mid or "B" block.

It is the nature of the polymerization that the polymer mid-block is formed after an initial styrene block. Since the polymer mid-block which is formed in Step II (i.e., after formation of an initial styrene block), the mid-block cannot be analyzed in isolation, it must be analyzed in combination with the initial styrene block and the contribution of the initial styrene block must be subtracted from the sum to determine the parameters which characterize the mid-block. Four experimental quantities are used to calculate the percent styrene content in the polymer mid-block (Mid PSC) and the percent blocky styrene in the polymer mid-block (Mid-Blocky). (Note % BD12 for the mid-block is measured directly with no need to correct for a BD contribution from the Step I styrene block).

The molecular weights of the polybutadiene and polystyrene compositions were obtained by sampling the reaction mixture during living polymerization and conducting H-NMR. These "raw data" were adjusted by subtracting the polystyrene component of the polystyrene block formed during Step I from the cumulative polystyrene content of the sample. The remainder gave the polystyrene component of the Step II block (i.e., B block) for each sample. The ratio of the polybutadiene content in moles to the polystyrene content in moles (as calculated in this way) was plotted against the level of conversion for each of the aliquots in each of the experiments. The molecular weight of the Step II block for each of the samples was obtained by subtracting the molecular weight of the Step I block from the molecular weight of the sample. The molecular weight of the Step II block (i.e., B block) for the final sample was taken as the total molecular weight for this region (i.e., 100% conversion).

The terms "molecular weight", "true molecular weight" or "number average molecular weight" used herein refer to the true number average molecular weight unless specified otherwise. Molecular weight was measured using gel permeation chromatography (GPC) calibrated with polybutadiene standards having known number average molecular weights. Polystyrene standards are also commonly used in the industry but do not result in a true molecular weight measurement. By measuring molecular weight with both polybutadiene and polystyrene standards of known molecular weight, a GPC calculation factor can readily be calculated to convert between true molecular weight and apparent molecular weight as measured according to polystyrene standards. The GPC factor to convert from apparent to true number average molecular weight for the block copolymers described herein are between 0.60-0.70. The GPC solvent for all samples was tetrahydrofuran.

It is also important to control the microstructure or vinyl content of the conjugated diene in the B blocks. The term "vinyl" has been used to describe the polymer product that is made when 1,3-butadiene is polymerized via a 1,2-addition mechanism. The result is a monosubstituted olefin group pendant to the polymer backbone, a vinyl group. In the case of anionic polymerization of isoprene, insertion of the isoprene via a 3,4-addition mechanism affords a geminal dialkyl C═C moiety pendant to the polymer backbone. The effects of 3,4-addition polymerization of isoprene on the final properties of the block copolymer will be similar to those from 1,2-addition of butadiene. When referring to the use of butadiene as the conjugated diene monomer, it is preferred that about 10 to 80 mol percent of the condensed butadiene units in the polymer block have a 1,2-addition configuration. Preferably, from about 30 to about 80 mol percent of the condensed butadiene units should have 1,2-addition configuration. When referring to the use of isoprene as the conjugated diene, it is preferred that about 5 to 80 mol percent of the condensed isoprene units in the block have 3,4-addition configuration. Polymer microstructure (mode of addition of the conjugated diene) is effectively controlled by addition of an ether, such as diethyl ether, a diether, such as 1,2-diethoxypropane, or an amine as a microstructure modifier to the diluent. Suitable ratios of microstructure modifier to lithium polymer chain end are disclosed in U.S. Pat. No. Re. 27,145.

The polymerization reaction in step 1 usually occurs within a period of time ranging from a few minutes up to about 6 hours. Preferably, the reaction is carried out within a time period of from about 10 minutes to about 2 hours. The polymerization temperature is not critical and will generally be in the range of from about 30° C. to about 100° C., preferably in the range of about 55° to about 85° C.

At the conclusion of the polymerization, in order to carry out the second or coupling step, the polymerization mixture is blended with the coupling agent. This is done before any material that would terminate the polymerization reaction and that would remove the lithium atom from the polymer chain end is added to the reaction mixture. Thus the blending of the polymerization mixture and the coupling agent is carried out before any material such as water, acid, or alcohol is added to inactivate the living polymer. The second step of coupling the living polymer is thus carried out as described in detail above. The third step is the hydrogenation, which is also described in detail above.

In one embodiment, the relative amounts of the tetra-branched (IV), tri-branched (III), di-branched (II) and linear diblock (I) species are: 0 to 90 weight percent tetra-branched IV, 0 to 90 weight percent tri-branched III, 0 to 90 weight percent di-branched II and 0 to 90 weight percent linear diblock I. In another embodiment, the relative amounts of the tetra-branched (IV), tri-branched (II), di-branched (II) and linear diblock (I) species are: 0 to 60 weight percent tetra-branched IV, 0 to 60 weight percent tri-branched III, 0 to 95 weight percent di-branched II and 0 to 70 weight percent linear diblock I. In yet another embodiment, the relative amounts of the tetra-branched (IV), tri-branched (II), di-branched (II) and linear diblock (I) species are: 0 to 5 weight percent tetra-branched IV, 0 to 60 weight percent tri-branched III, 40 to 95 weight percent di-branched II and 2 to 10 weight percent linear diblock I. Preferred amounts are: 0 to 5 weight percent IV, 0 to 36 weight percent III, 60 to 95 weight percent II and 4 to 8 weight percent I.

The block copolymer composition has a Coupling Efficiency ("CE") of about 90 to 98 weight percent, preferably about 92 to about 98 weight percent, most preferably greater than or equal to 90 percent. Coupling Efficiency is defined as the proportion of polymer chain ends which were living, P—Li, at the time the coupling agent was added that are linked via the residue of the coupling agent at the completion of the coupling reaction. In practice, Gel Permeation Chromatography (GPC) data is used to calculate the coupling efficiency for a polymer product. The sum of the areas under the GPC curve for all of the coupled species (II+III+IV) is divided by the sum of the areas under the GPC curve for all of the coupled moieties plus the area under the curve for the starting, uncoupled polymer species (I+II+III+IV). This ratio is multiplied by 100 to convert the coupling efficiency to a percentage value.

In some embodiments, the block copolymer is functionalized to include an additional functional group or moiety. For example, the block copolymer may be maleated. Maleated polyolefins may be obtained using any suitable methodology, such as by grafting maleic anhydride onto the block copolymer.

Maleation of the block copolymer may be done by in the melt, in solution, or in the solid state, and the process can be either continuous or batch. Various free radical initiators, including peroxides and azo compounds may be used to facilitate the maleation. Maleating agents can include anhydrides such as maleic anhydride, unsaturated dicarboxylic acids such as fumaric acid or other agents listed in columns 6-7 of U.S. Pat. No. 5,219,940. In some embodiments, the block copolymer contains from about 0.5 wt. % to about 2 wt. % maleation. Thus the present disclosure contemplates the hydrogenated styrenic block copolymer functionalized via reaction with maleic acid or anhydride. Such functionalized polymers have additional polarity that makes them particularly useful where adhesion to metals or other polar polymers is important, such as in overmolding, tie layer, adhesive, and coating applications or in compatibilization with certain engineering thermoplastics such as polyamides or epoxy resins for example.

In an alternative embodiment, the block copolymers of the present disclosure may be functionalized in a number of ways. One way is by treatment with an unsaturated monomer having one or more functional groups or their derivatives, such as carboxylic acid groups and their salts, anhydrides, esters, imide groups, amide groups, and acid chlorides. The preferred monomers to be grafted onto the block copolymers are maleic anhydride, maleic acid, fumaric acid, and their derivatives. A further description of functionalizing such block copolymers can be found in Gergen et al., U.S. Pat. No. 4,578,429 and in U.S. Pat. No. 5,506,299. In another manner, the selectively hydrogenated block copolymer of the present disclosure may be functionalized by grafting silicon or boron containing compounds to the polymer as described in U.S. Pat. No. 4,882,384. In still another manner, the block copolymer may be contacted with an alkoxy-silane compound to form silane-modified block copolymers. In yet another manner, the block copolymer may be functionalized by grafting at least one ethylene oxide molecule to the polymer as described in U.S. Pat. No. 4,898,914, or by reacting the polymer with carbon dioxide as described in U.S. Pat. No. 4,970,265. Still further, the block copolymers of the present disclosure may be metallated as described in U.S. Pat. Nos. 5,206,300 and 5,276,101, wherein the polymer is contacted with an alkali metal alkyl, such as a lithium alkyl. And still further, the block copolymers may be functionalized by grafting sulfonic groups to the polymer as described in U.S. Pat. No. 5,516,831. All of the patents mentioned in this paragraph are incorporated by reference into this application.

In some embodiments, the compositions and articles as provided herein may be derived from any one of the following compositions.

Block copolymer compositions as provided herein may be blended with any other block copolymer including but not limited to SIS, SBS, SEBS, SIBS, S-isobutylene-S, SEPS, and SEEPS at any ratio.

Block copolymer compositions as provided herein may be blended with 1 to 60 wt. %, based upon the total weight of the composition, of a tackifying resin.

Tackifying resins include polystyrene block compatible resins and midblock compatible resins. The polystyrene block compatible resin may be selected from the group of coumarone-indene resin, polyindene resin, poly(methyl indene) resin, polystyrene resin, vinyltoluene-alphamethylstyrene resin, alphamethylstyrene resin and polyphenylene ether, in particular poly(2,6-dimethyl-1,4-phenylene ether). Such resins are e.g. sold under the trademarks "HERCURES", "ENDEX", "KRISTALEX", "NEVCHEM" and "PICCOTEX". Other suitable polystyrene compatible tackifiers are rosin esters, styrenated terpenes, polyterpenes, and terpene phenolics. These tackifiers are sold under the trademarks Sylvalite®, Sylvatac®, or Sylvamelt® for rosin esters, Zonatac® for styrenated terpenes, and Sylvares® for polyterpenes and terpene phenolics, all by Arizona Chemical Co.® Additionally, copolymers of various alkyl arene monomers such as alpha methyl styrene and para methyl styrene are a suitable tackifier. These tackifiers are sold under the name of ENDEX® by Eastman Chemical Co. One specific example of a polystyrene block compatible resin is Endex 160 which is an aromatic hydrocarbon resin having a ring and ball softening point of 159° C.

Resins compatible with the hydrogenated (mid) block may be selected from the group consisting of compatible $C_5$ hydrocarbon resins, hydrogenated $C_5$ hydrocarbon resins, styrenated $C_5$ resins, $C_5/C_9$ resins. Since the elimination or a significant reduction of $C_5$ tackifying resins is an important goal with the present invention, the following non-$0_5$ resins are preferred, namely: styrenated terpene resins, fully hydrogenated or partially hydrogenated $C_9$ hydrocarbon resins, rosins esters, rosins derivatives, dicyclopentadiene, and mixtures thereof. These resins are e.g. sold under the trademarks "WINGTAC", "REGALITE", "REGALREZ", "ESCOREZ", "ENDEX", "EASTOTAC", and "ARKON". Of specific utility in the present invention is Eastotac H-100W, manufactured by Eastman Chemical, which is a hydrogenated hydrocarbon resin having a ring and ball softening point of 100° C. Block copolymer compositions as provided herein may be blended with 1 to 60 wt. %, based upon the total weight of the final composition, of an oil. For example the composition may be blended with an extender oil. In an aspect, the extender oil is a mineral-based oil such as Treated Distilled aromatic extract (TDAE), Mild Extract Solvate (MES), Residual Aromatic Extract (RAE), Treated Aromatic Extract (TAE), naphthenic oil, black naphthenic oil, and vegetable oils such as sunflower oil, carnauba oil, linseed oil, rape seed oil and its derivatives from vegetable fatty acid and tall oil fatty acids. In another aspect the block copolymer composition may comprise mineral oils (paraffinic, naphthenic, or aromatic).

Block copolymer compositions as provided herein may be blended with one or more fillers.

The polymer blends of the present disclosure may be compounded further with other polymers, oils, fillers, reinforcements, antioxidants, stabilizers, fire retardants, antiblocking agents, lubricants and other rubber and plastic compounding ingredients without departing from the scope of this disclosure. Examples of various fillers that can be employed are found in the 1971-1972 Modern Plastics Encyclopedia, pages 240-247. A reinforcement material may be defined simply as the material that is added to a resinous matrix to improve the strength of the polymer. Most of these reinforcing materials are inorganic or organic products of high molecular weight. Various examples include glass fibers, asbestos, boron fibers, carbon and graphic fibers, whiskers, quartz and silica fibers, ceramic fibers, metal fibers, natural organic fibers, and synthetic organic fibers. Especially preferred are reinforced polymer blends in the present composition containing about 2 to about 80 percent by weight glass fibers, based on the total weight of the resulting reinforced blend. Coupling agents, such as various silanes, may be employed in the preparation of the reinforced blends.

Block copolymer compositions as provided herein may be blended with 1 to 95 wt. %, based upon the total weight of the final composition, of one or more polyolefins (e.g., polyethylenes, polypropylenes, polybutylenes, atactic poly-alpha olefins, copolymers thereof). Olefin polymers include, for example, ethylene homopolymers, ethylene/alpha-olefin copolymers, propylene homopolymers, propylene/alpha-olefin copolymers, high impact polypropylene, butylene homopolymers, buylene/alpha olefin copolymers, and other alpha olefin copolymers or interpolymers. Amorphous poly-alpha olefins are also included herein. Representative polyolefins include, for example, but are not limited to, substantially linear ethylene polymers, homogeneously branched linear ethylene polymers, heterogeneously branched linear ethylene polymers, including linear low density polyethylene (LLDPE), ultra or very low density polyethylene (ULDPE or VLDPE), medium density polyethylene (MDPE), high density polyethylene (HDPE) and high pressure low density polyethylene (LDPE). Other polymers included hereunder are metallocene polyolefin copolymer elastomers such as Vistamaxx™, Versify™ and INFUSE™ and ethylene/acrylic acid (EEA) copolymers, ethylene/methacrylic acid (EMAA) ionomers, ethylene/vinyl acetate (EVA) copolymers, ethylene/vinyl alcohol (EVOH) copolymers, ethylene/cyclic olefin copolymers (COCs), polypropylene homopolymers and copolymers, propylene/styrene copolymers, ethylene/propylene copolymers, polybutylene, ethylene carbon monoxide interpolymers (for example, ethylene/carbon monoxide (ECO) copolymer, ethylene/acrylic acid/carbon monoxide terpolymer and the like. Still other polymers included hereunder are polyvinyl chloride (PVC) and blends of PVC with other materials.

Block copolymer compositions as provided herein may be blended with 1 to 95 wt. %, based upon the total weight of the final composition, of one or more styrene polymer. Styrene polymers include, for example, crystal polystyrene, high impact polystyrene, medium impact polystyrene, styrene/acrylonitrile copolymers, styrene/acrylonitrile/butadiene (ABS) polymers, syndiotactic polystyrene and styrene/olefin copolymers. Representative styrene/olefin copolymers are substantially random ethylene/styrene copolymers, preverably containing at least 20, more preferably equal to or greater than 25 weight percent copolymerized styrene monomer. Also included are styrene-grafted polypropylene polymers, such as those offered under the tradename Interly®, originally developed by Himont, Inc. (now Basell).

Block copolymer compositions as provided herein may be blended with 1 to 99 wt. %, based upon the total weight of the final composition, or alternatively with 50 to 95 wt. % based upon the total weight of the final composition, or alternatively with 75 to 95 wt. % based upon the total weight of the final composition, of one or more engineering thermoplastics. The resulting blend may include a combination of non-maleated and maleated versions of the block copolymer compositions as provided herein.

For the purposes of the specification and claims, the term "engineering thermoplastic resin" encompasses the various polymers found in the classes listed below, and further described in U.S. Pat. No. 4,107,131, the disclosure of which is hereby incorporated by reference in its entirety. Engineering thermoplastic resins include, but are not limited to, Thermoplastic Polyester, Thermoplastic Polyurethane, Poly (aryl ether) and Poly(aryl sulfone), Polycarbone, Actyl resin, Polyamide, Halogenated thermoplastic, Nitrile barrier resin, Poly(methyl methacrylate), and/or Cyclic Olefin Copolymers. Herein copolyester elastomers are block copolymers containing a) hard polyester segments and b) soft and flexible polyester segments. Examples of hard polyester segments include without limitation polyalkylene terephthalates and poly(cyclohexanedicarboxylic acid cyclohexanemethanol). Examples of soft polyester segments include without limitation aliphatic polyesters, including polybutylene adipate, polytetramethyladipate and polycaprolactone. In an aspect, the polyester contains blocks of ester units of a high melting polyester and blocks of ester units of a low melting polyester which are linked together through ester groups and/or urethane groups.

In some embodiments of this disclosure, compositions are contemplated that comprise a functionalized block copolymer of the type disclosed herein (e.g., maleated) and at least one thermoplastic engineering resin where the block copolymer may be present in an amount ranging from about 1 wt. % to about 99 wt. % based on the total weight of the composition, or alternatively from about 5 wt. % to about 50 wt. % based on the total weight of the composition, or alternatively from about 5 wt. % to about 25 wt. % based on the total weight of the composition.

The copolymers of the present disclosure can be compounded with other components not adversely affecting the copolymer properties. Exemplary materials that could be used as additional components would include, without limitation, pigments, antioxidants, stabilizers, surfactants, waxes, flow promoters, oils, solvents, particulates, scratch additives, and materials added to enhance processability and pellet handling of the composition.

In an embodiment, one or more the processes for utilization of the compositions disclosed herein include contacting with a solvent. A solvent suitable for use in the present disclosure is an organic compound whose participation in atmospheric photochemical reactions is negligible. For example solvents suitable for inclusion in compositions of the present disclosure include without limitation ethane methylene chloride (dichloromethane); 1,1,1-trichloroethane (methyl chloroform); 1,1,2-trichloro-1,2,2-trifluoroethane; (CFC-113) trichlorofluoromethane; (CFC-11) dichlorodifluoromethane; (CFC-12) chlorodifluoromethane; (HCFC-22) trifluoromethane; (HFC-23) 1,2-dichloro 1,1,2,2-tetrafluoroethane (CFC-114); chloropentafluoroethane (CFC-115); 1,1,1-trifluoro 2,2-dichloroethane (HCFC-123); 1,1,1,2-tetrafluoroethane (HCFC-134a); 1,1-dichloro-1-fluoroethane (HCFC-141b); 1-chloro-1,1-difluoroethane (HCFC-142b); 2-chloro-1,1,1,2-tetrafluoroethane (HCFC-124); pentafluoroethane (HFC-125); 1,1,2,2-tetrafluoroethane (HFC-134); 1,1,1-trifluuoroethane (HFC-143a); 1,1-difluoroethane (HFC-152a); parachlorobenzotrifluoride (PCBTF); cyclic, branched, or linear completely methylated siloxanes; acetone perchloroethylene (tetrachloroethylene); 3,3-dichloro-1,1,1,2,2-pentafluoropropane (HCFC-225ca); 1,3-dichloro-1,1,2,2,3-pentafluoropropane (HCFC-225cb); 1,1,1,2,3,4,4,5,5,5-decafluoropentane (HFC-43-10mee); difluoromethane (HFC-32); ethylfluoride (HFC-161); 1,1,1,3,3-hexafluoropropane (HFC-236fa); 1,1,2,2,3-pentafluoropropane (HFC-245ca); 1,1,2,3,3-pentafluoropropane (HFC-245ea); 1,1,1,2,3-pentafluoropropane (HFC-245cb); 1,1,1,3,3-pentafluoropropane (HFC-245fa); 1,1,1,2,3,3-hexafluoropropane (HFC-236ea); 1,1,1,3,3-pentafluorobutane (HFC-365-mfc); chlorofluoromethane (HCFC-31); 1-chloro-1-fluoroethane (HCFC-151a); 1,2-dichloro-1,1,2-trifluoroethane (HCFC-123a); 1,1,1,2,2,3,3,4,4-nonafluoro-4-methoxy-butane ($C_4F_9OCH_3$); 2-(difluoromethoxymethyl)-1,1,1,2,3,3,3-heptafluoropropane (($CF_3$)$_2$ $CFCF_2OCH_3$); 1-ethoxy-1,1,2,2,3,3,4,4,4-nonafluorobutane ($C_4F_9OC_2H_5$); 2-(ethoxydifluoromethyl)-1,1,1,2,3,3,3-heptafluoropropane (($CF_3$)$_2CFCF_2OC_2H_5$) methyl acetate; and perfluorocarbon compounds which fall into these classes: (i) Cyclic, branched, or linear, completely fluorinated alkanes (ii) Cyclic, branched, or linear, completely fluorinated ethers with no unsaturations (iii) Cyclic, branched, or linear, completely fluorinated tertiary amines with no unsaturations (iv) Sulfur containing perfluorocarbons with no unsaturations and with sulfur bonds only to carbon and fluorine. Other nonlimiting examples of solvents suitable for use in the present disclosure include cyclohexane, toluene, n-hexane, n-heptane, and Aromatic 100.

The copolymers and compositions described herein are useful in a wide variety of applications, including, for example, solvent based hot melt coatings, hot melt adhesives, pressure sensitive adhesives in single or multi-layer coatings, injection molded or extruded articles including, but not limited to, films, fibers, webs, tubing, consumer goods, profiles, overmolds, skins, toughened rigid articles and the like.

EXAMPLES

In all Examples, solutions viscosity was measured at 20% polymer content in toluene at 25° C.

Example 1

An anionically polymerized, selectively hydrogenated, methytrimethoxysilane (MTMS) coupled S-EBx block copolymer with a styrene block number average molecular weight of 7.3 kg/mol (measured by GPC), a unhydrogenated butadiene block true molecular weight of 14.2 kg/mol and a 94.5% coupling efficiency (two arm plus three arm polymer, measured by GPC). The lithium/silica ratio (typically 0.45) was set to make more linear (two arm) polymer than three arm polymer with a minimal amount of uncoupled one arm polymer (typically less than 10%). The subsequent two arm concentration was 69% with a true molecular weight of 42.5 kg/mol. High coupling efficiency (two arm and three arm) is required to obtain good strength and elasticity. High two arm polymer concentration is preferred, to reduce the melt and solution viscosity of the polymer. This example represents the upper range of the styrene block molecular weight at thirty weight percent styrene (measured by proton NMR). Table 1 lists the styrene block molecular weight, B block molecular weight, coupling efficiency, two arm concentration, two arm molecular weight, percent styrene concentration and solution viscosity for the various examples. Table 2 lists the 100% modulus, tensile strength, elongation to break and melt flow for the various examples.

Example 2

An anionically polymerized, selectively hydrogenated, MTMS coupled S-EBx block copolymer with a number average block molecular weight of 5.5 kg/mol, a Bd block molecular weight of 13.8 kg/mol and 90% coupling efficiency. As in Example 1, the lithium/silica ratio was adjusted for high two arm polymer concentration (73%) and a minimum amount of one arm polymer concentration. This example represents the lower end of the styrene block molecular weight at 30% styrene (refer to Table 1 and Table 2 for more details).

Example 3

An anionically polymerized, selectively hydrogenated, MTMS coupled S-EBx block copolymer with a styrene block molecular weight of 5.9 kg/mol, a Bd block molecular weight of 18.8 kg/mol and 92% coupling efficiency. Like Examples 1 and 2, the two arm concentration is high (83%) and the one arm concentration is low. This example represents the upper range of the true molecular weight (two arm polymer) at 25% styrene (refer to Tables 1 and 2 for details).

TABLE 1

Polymer Description and Solution Viscosity.
Solution viscosity at 20 wt. % polymer in toluene at 25° C.

| Polymer | Styrene Block MW (kg/mol) | True Bd Block MW (kg/mol) | Coupling Efficiency (wt %) | True Di-Branched MW (kg/mol) | Two Arm Styrene Equivalent MW (kg/mol) | GPC Factor | Two Arm Concentration (wt %) | Polystyrene Concentration (wt %) | Solution Viscosity (cP) |
|---|---|---|---|---|---|---|---|---|---|
| Ex. 1 | 7.3 | 14.2 | 94.5 | 42.5 | 64 | 0.66 | 69 | 30.9 | 214 |
| Ex. 2 | 5.5 | 13.8 | 90 | 38.6 | 58.5 | 0.66 | 73 | 29.8 | 150 |
| Ex. 3 | 5.9 | 18.8 | 92 | 49.4 | 77 | 0.64 | 83 | 25.4 | 360 |
| Ex. 4 | 7.1 | 37 | N/A | 52* | 79* | 0.66 | N/A | 29 | 465 |
| Ex. 5 | 6.5 | 29.5 | >90 | 73 | 117 | 0.62 | >80 | 19 | ≥400 |
| Ex. 6 | 8.5 | 20 | >90 | 57 | 86 | 0.66 | >80 | 30 | >360 |

*Based on an anionically, sequentially polymerized S-EB-S triblock copolymer, i.e., anionic polymerization of a styrene block followed by a butadiene block and another styrene block and then selectively hydrogenated. The molecular weight is for a sequential SEBS triblock copolymer

Example 4

An anionically polymerized, selectively hydrogenated, full sequential, S-EB-S block copolymer with a first styrene block molecular weight of 7.1 kg/mol and a butadiene block molecular weight of approximately 37 kg/mol and a second styrene block (third block) molecular weight of between 8 and 8.3 kg/mol. This polymer represents the difference between a full sequential polymer and an equivalent coupled polymer (Example 1). The solution viscosity is significantly lower for Example 1 (214 cP) compared to Example 4 (465 cP), see Table 1.

Example 5

An anionically polymerized, selectively hydrogenated, MTMS coupled S-EBx block copolymer with a styrene block molecular weight of 6.5 kg/mol and butadiene block molecular weight of 29.5 kg/mol and greater than 90% coupling efficiency. Like the examples, the two arm concentration is high (greater than 80%). This polymer represents the mid-range molecular weight (the Bd molecular weight is 29.5 kg/mol because the polystyrene concentration is relatively low at 19%) for Atwood et al. The solution viscosity is significantly higher than Examples 1 and 3, 260 and 360 cP respectively.

Example 6

An anionically polymerized, selectively hydrogenated, MTMS coupled S-EBx block copolymer with a styrene block molecular weight of 8.5 kg/mol and butadiene block molecular weight of 20 kg/mol. and greater than 90% coupling efficiency. Like the examples, the two arm concentration is high (greater than 80%). This polymer represents the low-range molecular weight (the Bd molecular weight is 20 kg/mol and the polystyrene concentration is 30%) for Atwood et al. The solution viscosity is significantly higher than in Examples 1 and 3 at 260 and 360 cP respectively.

TABLE 2

Mechanical Property Comparison.
Melt cast film at 260-265° C. melt temperatures, MD is equal to the casting or machine direction and CD is equal to the cross-direction (perpendicular to the machine direction) of the film.

| Polymer | 100% Modulus (psi) MD/CD | Elongation to Break (%) MD/CD | Tensile Strength (psi) MD/CD | MFR at 230° C. and 5 kg (g/10 min.) |
|---|---|---|---|---|
| Ex. 1 | 730/250 | 660/710 | 4900/4500 | 31 |
| Ex. 2 | 390/380 | 560/620 | 5700/5500 | 108 |
| Ex. 3 | 330/320 | 600/620 | 5400/5800 | 71 |
| Ex. 4 | 670/230 | 760/770 | 5900/5200 | 2 |

The examples mechanical properties in Table 2 demonstrate that relatively low styrene block molecular weight (one of the sources of strength and modulus in styrenic block copolymers), and low melt viscosity (high MFR or lower molecular weight) can still lead to strong and tough (elongation to break) cast film; compare the tensile strength, elongation to break and MFR for Examples 2 and 3 in Tables 2 to the Example 4 in Table 2. Likewise, Table 2 illustrates equal biaxial mechanical properties (similar modulus in both the MD and CD direction) can be achieved if the styrene block is small enough (Example 1) or the percent polystyrene is low (Example 3). However, when the styrene block size is larger (Example 1 and Example 4) the mechanical properties, particularly the modulus, become anisotropic with a strong bias (higher modulus) in the machine direction.

Example 7

A compound with Example 2 and a 5 MFR polypropylene random copolymer (coPP) was made. Cast film was made from a blend comprised of 70 wt. % (Example 2) and 30 wt. % of a 5 MFR polypropylene random copolymer. The film properties (modulus, tensile strength, and elongation to break) were functionally equivalent to the compound made with a significantly higher molecular weight styrenic block copolymer (Example 4) but the compound had a much lower viscosity has demonstrated by higher melt flow rate (24.2 g/10 min. vs 2.5 g/10 min. MFR) than the compound made with Example 4; see Table 3. The lower viscosity of Example 7 leads to higher throughput rates at lower temperatures which increases yields and reduces energy costs.

Example 8

A compound with Example 4 and a 5 MFR polypropylene random copolymer. This compound is significantly higher viscosity as demonstrated by lower melt flow rate (2.5 g/10 min. MFR) than Example 7.

TABLE 3

Cast Film Mechanical Properties for Styrenic Copolymer Blends with a Polypropylene Random Copolymer.

| | | Example 8 | Example 7 |
|---|---|---|---|
| Example 4 | | 70% | |
| Example 2 | | | 70% |
| Random coPP (5 MFI) | | 30% | 30% |
| Melt flow @ 230° C./2.16 kg | | 2.5 | 24.2 |
| Tensile Properties | | | |
| Tensile strength, psi | MD | 5,920 | 5,600 |
| | CD | 5,810 | 4,670 |
| Elongation, % | MD | 705 | 628 |
| | CD | 793 | 634 |
| Tensile strength at yield, psi | MD | 643 | 687 |
| | CD | nm | nm |
| Elongation at yield, % | MD | 20 | 16 |
| | CD | nm | nm |
| Modulus 50%, psi | MD | 640 | 703 |
| | CD | 449 | 454 |
| Modulus 100%, psi | MD | 702 | 786 |
| | CD | 491 | 575 |
| Modulus 300%, psi | MD | 1,340 | 1,510 |
| | CD | 918 | 1,140 |
| Modulus 500%, psi | MD | 3,073 | 3,590 |
| | CD | 2,063 | 2,960 |

Example 9

This example represents a hot melt adhesive formulation using Example 2; see Table 4. Table 5 and FIG. 1 demonstrate that lower viscosities (as a function of temperature) can be achieved with equivalent adhesive performance (peel strength and failure mode) compared to an equivalent formulation made with the higher molecular weight Example 4. However, because of the lower styrene block molecular weight in Example 2, the ring and ball softening temperature and shear adhesive failure temperature (SAFT) is lower than the adhesive formulation made with Example 4 which can be offset with the addition of other S-EB-S polymers while still maintaining lower formulated viscosity as shown in Example 10 below. Kraton G1650 is a medium molecular weight commercially available SEBS polymer.

TABLE 4

Hot Melt Adhesive Formulations.

| Composition (wt. %) | Example 11 | Example 9 | Example 10 |
|---|---|---|---|
| Example 4 | 25.0 | | |
| Example 2 | | 25.0 | 25.0 |
| Kraton G1650 | | | 4.0 |
| C$_9$ Resin | 30.0 | 30.0 | 28.0 |
| Naphthenic Oil | 44.0 | 44.0 | 42.0 |
| AO | 1.0 | 1.0 | 1.0 |

TABLE 5

Hot Melt Adhesive Performance.

| Composition (wt. %) | Example 11 | Example 9 | Example 10 |
|---|---|---|---|
| Ring & Ball Softening point (° F.) | 158° F. | 127.4° F. | 155° F. |
| Oil Bleed on paper after 24 hrs | none | none | None |
| SAFT (° C.) | 67 | 46 | 57 |
| 180° Peel to SS (lbf/in.) | 0.61 | 0.75 | 0.65 |
| Failure Mode | Adhesive | Slight cohesive | Adhesive |

Example 10

Figure 2:
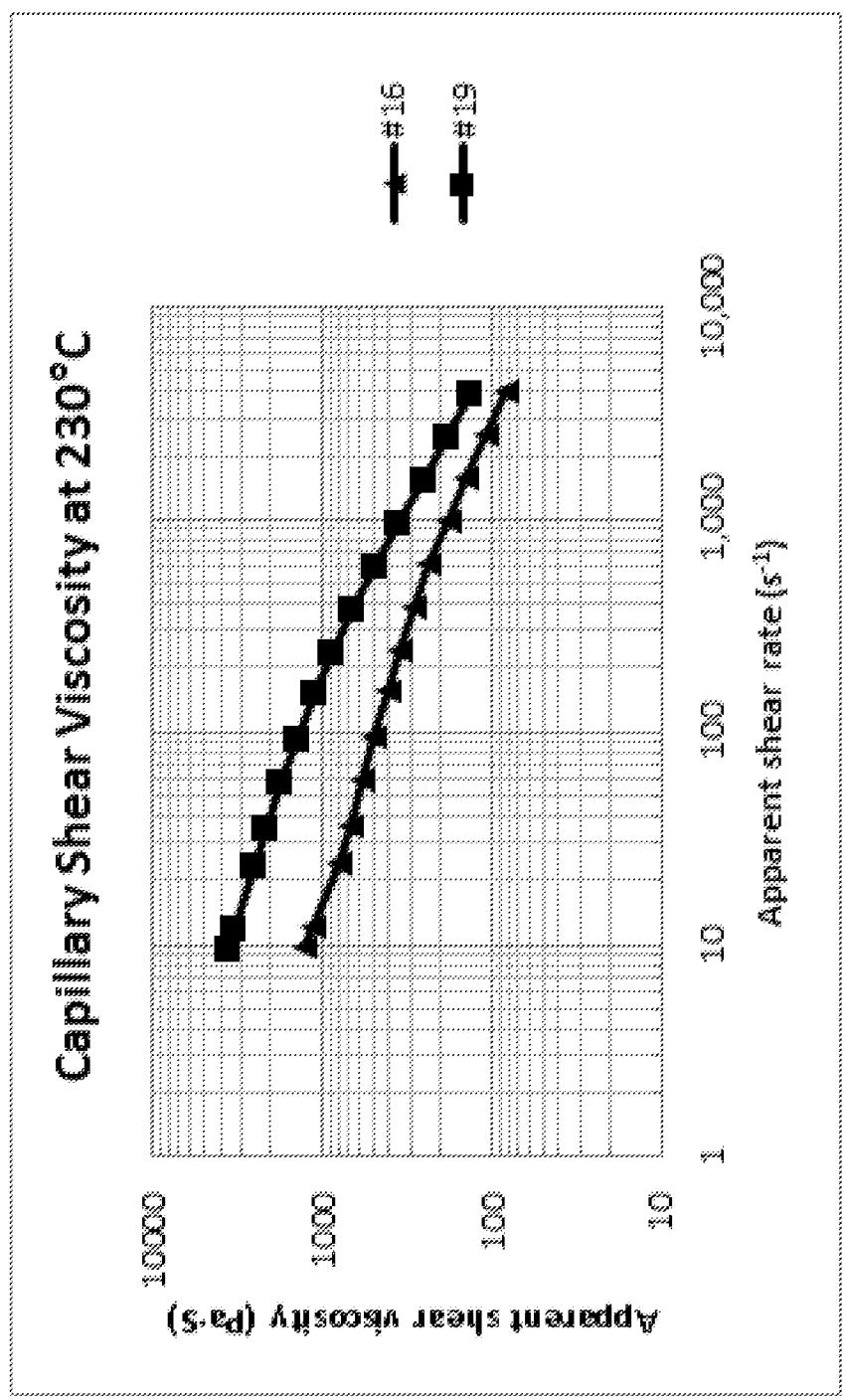
FIG. 2 is a plot of the capillary shear viscosity for the samples of Example 6.

There is an unmet industry need for low viscosity maleated SEBS polymers with high tensile strength. Maleation of an SEBS of the type disclosed herein was conducted on a 25 mm Berstorff extruder. SEBS, maleic anhydride (MA), and LUPEROX 101 (a free radical initiator) were premixed by dry blending before feeding to the extruder for maleation. Two different levels of maleation between 0.5% and 2.0% were explored. Table 6 shows the recipe, process conditions and results for maleation of an SEBS of the type disclosed herein with 1.5% feed MA, #15, 16, and 17; results for maleated comparative polymer (#19) and a commercial maleated SEBS (#20) were also tabulated in Table 7 for comparison. On the basis of bound and free MA %, #16 and #19 (both made on lab equipment) are quite close to the commercial product #20. FIG. 2 shows that a maleated SEBS of the type desired herein (#16) has much lower shear viscosity than the maleated comparative polymer (#19). Lab maleated comparative polymer has higher shear viscosity than commercial maleated SEBS, so it is expected that a maleated SEBS of the type disclosed herein on a commercial line have even lower shear viscosity due to more severe processing conditions.

The tensile properties of samples #16-=, 19, and 20 are shown in Table 7. All samples have acceptable tensile properties.

TABLE 6

| Example | feed MA (%) | Initiator (%) | temperature (° C.) | bound MA (%) | free MA (%) | YI |
|---|---|---|---|---|---|---|
| #15 | 1.5 | 0.44 | 205 | 0.72 | 0.11 | NA |
| #16 | 1.5 | 0.44 | 215 | 1.11 | 0.13 | 17.7 |
| #18 | 1.5 | 0.44 | 225 | 0.95 | 0.29 | NA |
| #19 | 1.5 | 0.44 | 225 | 1.21 | 0.10 | 9.7 |
| #20 | 1.5 | 0.44 | NA | 1.13 | 0.03 | 7.3 |

TABLE 7

| Example | 100% modulus (psi) | 200% modulus (psi) | 300% modulus (psi) | 500% modulus (psi) | Tensile strength (psi) | Elongation at break (%) |
|---|---|---|---|---|---|---|
| #16 | 420 | 660 | 1100 | 3710 | 4920 | 570 |
| #19 | 430 | 690 | 1180 | 3880 | 5900 | 620 |
| #20 | 450 | 650 | 930 | 2280 | 4240 | 730 |

Bound MA % was determined by FTIR on purified samples, based on number average height ratio at ~1780 cm$^{-1}$ (attributed to C=O stretching) and 1600 cm$^{-1}$ (attributed to benzene ring stretching). A calibration curve was generated based on maleated samples with pre-determined bound MA % by titration or NMR. Purification was conducted by 3 cycles of dissolution/precipitation in toluene/isopropanol to get rid of any unbound or free MA, followed by drying at 80° C. to constant weight, and further drying at 140° C. for 7 hours to convert any hydrolyzed diacid products to anhydride groups. Free MA % was calculated by measuring the MA % on both unpurified and purified samples and calculating the difference in their results. Tensile properties were measured on solution cast film samples according ASTM D412. A Mini D die was used to cut the specimens and a 50 mm/min. tensile rate was used.

Example 11

Figure 3:
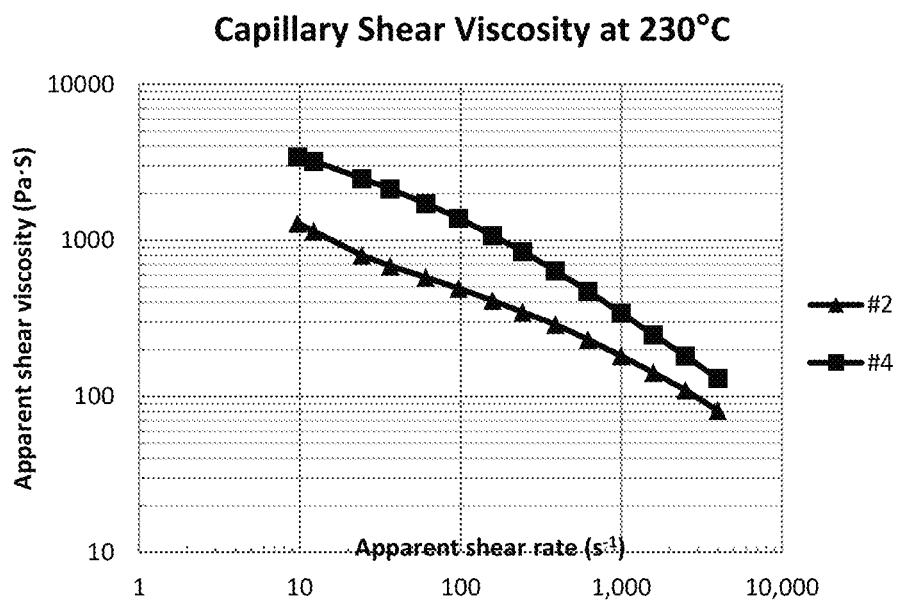
FIG. 3 is a plot of the capillary shear viscosity for the samples from Example 11.

This example represents a hot melt adhesive formulation using Example 4; see Table 4. FIG. 3 demonstrates that a formulation made with Example 4 has a significantly higher viscosity than an equivalent formulation made with Example 2. Table 5 demonstrates the higher styrene block size in Example 4 leads to a higher ring and ball softening temperature and SAFT. However, the adhesive performance (peel strength and failure mode) was equivalent to the formulation with Example 2.

Example 12

An anionically polymerized, selectively hydrogenated, polymer was made with the lowest MW range (30% PSE, 8.5 kg/mol styrene block) of Atwood, et. al. The polymer was designated Polymer Z. An analysis of Polymer Z was performed and the data presented in Tables 8 and 9. Even though the tensile strength (as shown in Table 9) of Polymer Z is high, it does not have a solution viscosity within the desired range (100-400 cps). Tensile strength was measured according to ASTM D412 method.

TABLE 8

Polymer Z Properties

| Polymer Z | Parameters | Target (kg/mole) |
|---|---|---|
| Styrene Block MW | 8.4 kg/mol | 8.5 |
| Butadiene Block MW | 19.8 kg/mol | 20 |
| Coupling Efficiency | 93% | >90 |
| Polystyrene Content | 30.6 w % | |
| Vinyl Content | 38.2 w % | |
| Solution Viscosity at 25° C., cps | 562 | |

TABLE 9

Polymer Z Tensile Properties

| Tensile Values | psi |
|---|---|
| 25% Modulus | 539 |
| 50% Modulus | 571 |
| 100% Modulus | 676 |
| 200% Modulus | 911 |
| 300% Modulus | 1217 |
| 500% Modulus | 2630 |
| Ultimate Stress | 5500 |
| Ultimate Strain, % | 776 |

Example 12

Low viscosity, slump resistance sealants with low VOC content are desirable for a variety of applications. Basic sealant formulations were made by adding the ingredients to the solvent and rolling until fully dissolved at room temperature. The formulations were then mixed in a DAC mixer for approximately 1-3 minutes with no externally applied heat until smooth and consistent. 1 inch beads of sealant were applied to 6 inch long stainless steel channels and slump resistance was measured according to ASTM C639.

ASTM C639 is entitled "Standard Test Method for Rheological (Flow) Properties of Elastomeric Sealants." This test method is used to determine rheological (flow) properties of single and multicomponent chemically curing sealants. Rheological testing described herein was performed at room temperature per Type 2 joint sealants. Samples and channels were conditioned at room temperature prior to testing. Slump measurements were recorded after 6 hours of vertical placement. These results are presented in Table 10. This test method was approved on Jun. 1, 2011 and published in August, 2011, the contents of which are incorporated herein by reference in its entirety.

Sealants made with Example 4 polymers have too high of viscosity to achieve VOC <250 g/L. However sealants made with Example 2 polymers are low viscosity and can further be modified with VOC exempt solvents (like PCBTF) to achieve viscosity requirements suitable for application while achieving <100 g/L calculated VOC content and acceptable slump resistance (<1 in). Another low viscosity polymer was evaluated for comparison, Polymer X, which likewise enables low viscosity and <100 g/L calculated VOC but does not achieve the slump resistance requirement of <1 in. Polymer X is akin to Polymer 2 described in U.S. Ser. No. 13/243,533. It is thus demonstrated that having low viscosity alone as in Polymer X does not satisfy the need for low viscosity, low VOC, slump resistant sealants whereas Example 2 is sufficient to satisfy this need.

TABLE 10

| Ingredient (wt. %) | S-1 | S-2 | S-20 | S-21 |
|---|---|---|---|---|
| Example 4 | 14.1 | | | |
| Example 2 | | 14.1 | 14.1 | |
| Polymer X | | | | 14.1 |
| Kraton G1701 | 6.8 | 6.8 | 6.8 | 6.8 |
| Eastotac H-100W | 34.0 | 34.0 | 34.0 | 34.0 |
| Kristalex 5140 | 14.4 | 14.4 | 14.4 | 14.4 |
| Irganox 1010 | 0.7 | 0.7 | 0.7 | 0.7 |
| Toluene | 30.0 | 30.0 | 6.0 | 6.0 |
| PCBTF | 0 | 0 | 24.0 | 24.0 |
| wt. % Solids, Tol/PCBTF | 70 (100/0) | 70 (100/0) | 70, (20/80) | 70, (20/80) |
| Calculated VOC (g/L) | 288 | 288 | 78 | 78 |
| Slump Resistance (RT, in) | 0 | >6 | 0.25 | 1.75 |

Additional Disclosure

The following enumerated aspects of the present disclosures are provided as non-limiting examples.

A first aspect which is a block copolymer composition comprising (a) a tetra-branched block copolymer (IV) having a number average molecular weight of 40,000 to 120,000 represented by the general formula (A-B)4X; (b) a tri-branched block copolymer (III) having a number average molecular weight of from 30,000 to 90,000 represented by the general formula (A-B)3X; (c.) a di-branched block copolymer (II) having a number average molecular weight of from 20,000 to 60,000 represented by the general formula (A-B)2X; and (d) a linear diblock copolymer (I) having a number average molecular weight of from 10,000 to 30,000 represented by the general formula A-B; where: (i) A represents a polymer block of a mono alkenyl arene, wherein the A block has a number average molecular weight ranging from 4,000 to 7,500 g/mol; (ii) B represents a polymer block of a conjugated diene, wherein the B block has a weight average molecular weight ranging from 7,000 to 20,000 g/mol; and (iii) X represents the residue of an alkoxy silane coupling agent.

A second aspect which is the composition of the first aspect wherein the alkoxy silane coupling agent has the formula Rx—Si—(OR')y, where x is 0 or 1, x+y=4, R and R' are the same or different, R is selected from the group consisting of aryl hydrocarbon radicals, linear alkyl hydrocarbon radicals and branched alkyl hydrocarbon radicals, and R' is selected from the group consisting of linear and branched alkyl hydrocarbon radicals.

A third aspect which is the composition of any of the first through second aspects wherein the block copolymer composition comprises (a) 0 to 90 wt. %, based upon the total weight of the block copolymer composition, of the tetra-branched block copolymer (IV); (b) 0 to 90 wt. %, based upon the total weight of the block copolymer composition, of the tri-branched block copolymer (III); (c) 0 to 90 wt. %, based upon the total weight of the block copolymer composition, of the di-branched block copolymer (II); and (d) 0 to 90 wt. %, based upon the total weight of the block copolymer composition, of the linear diblock copolymer (I).

A fourth aspect which is the composition of any of the first through third aspects wherein the block copolymer composition has a solution viscosity ranging from 100 to 400 centipoise (cP), as measured in 20 wt. % of toluene at 25° C.

A fifth aspect which is the composition of the fourth aspect wherein the block copolymer composition has a solution viscosity ranging from 140 to 375 centipoise (cP), as measured in 20 wt. % of toluene at 25° C.

A sixth aspect which is the composition of any of the first through the fifth aspects wherein the block copolymer composition has a melt flow rate ranging from 20 to 200 g/10 min., as measured at 230° C. with a load of 5 kg.

A seventh aspect which is the composition of any of the first through sixth aspects wherein the block copolymer composition has a tensile strength ranging from 2000 to 8000 psi, as measured on melt cast films.

An eighth aspect which is the composition of any of the first through seventh aspects wherein the block copolymer composition has an anisotropy ratio based upon the MD/CD 300% modulus of less than 1.4.

A ninth aspect which is the composition of any of the first through eighth aspects wherein at least one block of the block copolymer composition is functionalized.

A tenth aspect which is the composition of the ninth aspect wherein functionalization comprises grafting with an acid compound or its derivative.

An eleventh aspect which is the composition of the tenth aspect wherein said acid compound or its derivative is selected from the group consisting of maleic anhydride, maleic acid, fumaric acid, and its derivatives.

A twelfth aspect which is the composition of the tenth aspect wherein said acid compound or its derivative is maleic anhydride or maleic acid.

A thirteenth aspect which is a mixture comprising (i) from about 1 to about 99 weight percent of an engineering thermoplastic resin selected from the group consisting of polyamides, polyesters and copolymers thereof, and polyurethanes and (ii) from about 1 to about 99 weight percent of the composition of the twelfth aspect.

A fourteenth aspect which is a block copolymer composition comprising (a) a tetra-branched block copolymer (IV) having a number average molecular weight of 40,000 to 120,000 represented by the general formula (A-B)4X; (b) a tri-branched block copolymer (III) having a number average molecular weight of from 30,000 to 90,000 represented by the general formula (A-B)3X; (c) a di-branched block copolymer (II) having a number average molecular weight of from 20,000 to 60,000 represented by the general formula (A-B)2X; and (d) a linear diblock copolymer (I) having a number average molecular weight of from 10,000 to 30,000 represented by the general formula A-B; where: (i) a represents a polymer block of a mono alkenyl arene, wherein the A block has a number average molecular weight ranging from 4,000 to 7,500 g/mol; (ii) B represents a polymer block of a conjugated diene, wherein the B block has a weight average molecular weight ranging from 7,000 to 20,000 g/mol; and (iii) X represents the residue of an alkoxy silane coupling agent wherein the composition has a solution viscosity of from about 100 cp to about 400 cp.

A fifteenth aspect which is the composition of the fourteenth aspect having a tensile strength of from about 4000 psi to about 6000 psi when determined in accordance with ASTM D412 or ASTM D638.

A sixteenth aspect which is the composition of any of the fourteenth through fifteenth aspects wherein at least one block copolymer is maleated.

A seventeenth aspect which is the composition of any of the fourteenth through sixteenth aspects further comprising an engineering thermoplastic resin.

An eighteenth aspect which is the a mixture comprising (i) from about 5 wt. % to about 95 wt. % of a polyolefin selected from the group consisting of polypropylene, polyethylene, polybutylene, amorphous polyolefin, polyolefin elastomers and copolymers thereof, and (iii) from about 5 wt. % to about 95 wt. % of the composition of the first aspect.

A nineteenth aspect which is a mixture comprising (i) from about 10 wt. % to about 50 wt. % of tackifying resin, (ii) from about 20 wt. % to about 60 wt. % of oil, and (iii) from about 15 wt. % to about 35 wt. % of the composition of the first aspect.

A twentieth aspect which is a mixture comprising (i) from about 10 wt. % to about 50 wt. % of tackifying resin, and (ii) from about 50 wt. % to about 90 wt. % of the composition of the first aspect.

A twenty-first aspect which is a mixture comprising of a) at least one of (i) from about 0.01 wt. % to about 50 wt. % of the polystyrene polymer or ii) from about 0.01 wt. % to about 30 wt. % of oil, and (b) from about 20 wt. % to about 80 wt. % of the composition of the first aspect.

The invention claimed is:

1. A block copolymer composition comprising:
   a. 0 to 5 weight percent of a tetra-branched block copolymer (IV) having a number average molecular weight of 44,000 to 80,000 represented by the general formula (A-B)4X;
   b. greater than 0 to 60 weight percent of a tri-branched block copolymer (III) having a number average molecular weight of from 33,000 to 60,000 represented by the general formula (A-B)3X;
   c. 40 to 95 weight percent of a di-branched block copolymer (II) having a number average molecular weight of from 22,000 to 40,000 represented by the general formula (A-B)2X; and
   d. 2 to 10 weight percent of a linear diblock copolymer (I) having a number average molecular weight of from 11,000 to 20,000 represented by the general formula A-B; where:
      i. A represents a polymer block of a mono alkenyl arene, wherein the A block has a number average molecular weight ranging from 4,000 to 7,000 g/mol;
      ii. B represents a polymer block of a conjugated diene, wherein the B block has a number average molecular weight ranging from 7,000 to 13,000 g/mol and a vinyl content of 30 to 50 mol %; and
      iii. X represents the residue of an alkoxy silane coupling agent;
   wherein the block copolymer composition has a solution viscosity ranging from 100 to 400 centipoise (cP), as measured in 20 wt. % of toluene at 25° C.

2. The composition of claim 1, wherein the alkoxy silane coupling agent has the formula Rx-Si—(OR')y, where x is 0 or 1, x+y=4, R and R' are the same or different, R is selected from the group consisting of aryl hydrocarbon radicals, linear alkyl hydrocarbon radicals and branched alkyl hydrocarbon radicals, and R' is selected from the group consisting of linear and branched alkyl hydrocarbon radicals.

3. The composition of claim 1, wherein the block copolymer composition comprises:
   a. 0 to 5 wt. %, based upon the total weight of the block copolymer composition, of the tetra-branched block copolymer (IV);
   b. greater than 0 to 36 wt. %, based upon the total weight of the block copolymer composition, of the tri-branched block copolymer (III);
   c. 60 to 95 wt. %, based upon the total weight of the block copolymer composition, of the di-branched block copolymer (II); and
   d. 4 to 8 wt. %, based upon the total weight of the block copolymer composition, of the linear diblock copolymer (I).

4. The composition of claim 1, wherein the block copolymer composition has a solution viscosity ranging from 140 to 375 centipoise (cP), as measured in 20 wt. % of toluene at 25° C.

5. The composition of claim 1, wherein the block copolymer composition has a melt flow rate ranging from 20 to 200 g/10 min., as measured at 230° C. with a load of 5 kg.

6. The composition of claim 1, wherein the block copolymer composition has a tensile strength ranging from 2000 to 8000 psi, as measured on melt cast films.

7. The composition of claim 1, wherein the block copolymer composition has an anisotropy ratio based upon the MD/CD 300% modulus of less than 1.4.

8. The composition of claim 1 wherein at least one block of the block copolymer composition is functionalized.

9. The composition of claim 8 wherein functionalization comprises grafting with an acid compound or its derivative.

10. The composition of claim 9 wherein said acid compound or its derivative is selected from the group consisting of maleic anhydride, maleic acid, fumaric acid, and its derivatives.

11. The composition of claim 9 wherein said acid compound or its derivative is maleic anhydride or maleic acid.

12. A mixture comprising (i) from about 1 to about 99 weight percent of an engineering thermoplastic resin selected from the group consisting of polyamides, polyesters and copolymer thereof, and polyurethanes and (ii) from about 1 to about 99 weight percent of the composition of claim 11.

13. The composition of claim 1 further comprising an engineering thermoplastic resin.

14. A mixture comprising (i) from about 5 wt. % to about 95 wt. % of a polyolefin selected from the group consisting of polypropylene, polyethylene, polybutylene, amorphous polyolefin, polyolefin elastomers and copolymers thereof, and (iii) from about 5 wt. % to about 95 wt. % of the composition of claim 1.

15. A mixture comprising (i) from about 10 wt. % to about 50 wt. % of tackifying resin, (ii) from about 20 wt. % to about 60 wt. % of oil, and (iii) from about 15 wt. % to about 35 wt. % of the composition of claim 1.

16. A mixture comprising (i) from about 10 wt. % to about 50 wt. % of tackifying resin, and (ii) from about 50 wt. % to about 90 wt. % of the composition of claim 1.

17. A mixture comprising of a) at least one of (i) from about 0.01 wt. % to about 50 wt. % of a polystyrene polymer or ii) from about 0.01 wt. % to about 30 wt. % of oil, and (b) from about 20 wt. % to about 80 wt. % of the composition of claim 1.

* * * * *